United States Patent [19]

Andrychuk

[11] 3,829,692

[45] Aug. 13, 1974

[54] IMAGE CONVERSION AND AMPLIFYING DEVICE

[75] Inventor: Dmetro Andrychuk, Richardson, Tex.

[73] Assignee: Texas Instruments Incorporated, Dallas, Tex.

[22] Filed: Apr. 13, 1970

[21] Appl. No.: 18,225

Related U.S. Application Data

[63] Continuation of Ser. No. 631,513, April 17, 1967, abandoned.

[52] U.S. Cl. .............................................. 250/330
[51] Int. Cl. .............................................. G01j 3/02
[58] Field of Search ...... 250/83.3 HP, 71, 213, 330; 350/160 P

[56] References Cited

UNITED STATES PATENTS 3,219,993 11/1965 Schwertz ............................ 340/224
3,365,576 1/1968 Teeg ................................... 250/330
3,410,999 11/1968 Fergason et al. ........ 250/83.3 HP X

*Primary Examiner*—James W. Lawrence
*Assistant Examiner*—Davis L. Willis
*Attorney, Agent, or Firm*—Harold Levine; Edward J. Connors, Jr.; William E. Hiller

[57] ABSTRACT

An image forming device comprising a layer of thermochromic material disposed between two electrically conductive layers, one of which is transparent, with a voltage source connected across the two conductive layers. The potential of the voltage source is selected so that when an image carried by a heat producing energy is focused onto the thermochromic material, the excess heat thresholds the thermochromic material to change its color, and the negative resistance of the thermochromic material results in a current flow which tends to amplify and hold the image by increasing and maintaining the temperature above the critical temperature.

8 Claims, 4 Drawing Figures

INVENTOR
DMETRO ANDRYCHUK

E. Mickey Hubbard
ATTORNEY

INVENTOR
DMETRO ANDRYCHUK

E. Mickey Hubbard
ATTORNEY

IMAGE CONVERSION AND AMPLIFYING DEVICE

This is a continuation of application Ser. No. 631,513, filed Apr. 17, 1967, and now abandoned.

In another embodiment, a layer of electro luminescent material is included between the two conductive layers so that an image of varying intensity may be formed in the electro luminescent layer when a heat producing image is focused on the thermochromic material due to the change in conductivity of the thermochromic material.

In yet another embodiment, two mutually perpendicular sets of parallel conductors separated by a sheet of high resistivity material are used to heat the thermochromic material to its threshold temperature at selected coordinate points to produce a desired visible image. The coordinate points may be maintained above the critical temperature by the application of voltage across the thermochromic layer.

This invention relates generally to information displays, and more particularly relates to the formation, amplification and retention of images. There are many instances when it is desirable to transform invisible date, such as an image carried by infrared light or by electrical signals, to a visible representation of the data.

It is an object of this invention to provide such a display device that has no moving parts and therefore has a long and dependable service life.

Another object is to provide a device for transforming an infrared image into a visible image.

A further object is to provide such a device which amplifies an infrared image.

Still another object is to provide such a device having good resolution.

Another object is to provide such a device capable of producing a luminescent image having a range of intensity levels as opposed to a passive image having only two different colors.

Yet another object is ro provide such a device for reproducing an image carried by electrical data in coordinate point form.

Briefly, one embodiment of the invention comprises a layer of thermochromic material disposed between two conductive layers so that a voltage can be applied across the layer of thermochromic material. The thermochromic material exhibits a reversible color change at a critical temperature, and a marked increase in conductivity at the critical temperature. At least one of the conductive layers is transparent. A means is provided for directing a heat producing image onto the thermochromic material. The heat produced by the image increases the current through the thermochromic material and the combined heat produced by the image and the increased current changes the color of the thermochromic material to display the image which may be seen through the transparent conductive layer. The increased electrical conductivity of the thermochromic material promotes the formation of the image, thus providing amplification, and also retains the iamge so long as the voltage is maintained across the thermochromic material.

In another embodiment of the invention, a layer of electro luminescent material is included with the thermochromic material between the two conductive layers. When a heat image is directed onto the thermochromic material, its conductivity increases, thus changing the degree of luminescence of the electro luminescent material. As a result, the original infrared image is amplified and also reproduced as a luminescent image with varying degrees of brightness.

In still another embodiment of the invention, the heat image is produced by two sets of mutually perpendicular conductors separated by a layer of high resistivity material, a layer of thermochromic material being positioned above and in thermo contact with one of the two sets of mutually perpendicular conductors. A means is provided for selectively applying a voltage between any two of the mutually perpendicular conductors to heat a predetermined coordinate point of the resistive material and thus heat the adjacent thermochromic material to a temperature above its critical temperature, thus causing a color transition at the corresponding coordinate point. The color transition can be maintained by a voltage across the thermochromic material.

For a more complete understanding of the present invention, and for further objects and advantages thereof, reference may now be had to the following description when read in conjunction with the accompanying drawings wherein.

Figure 1:
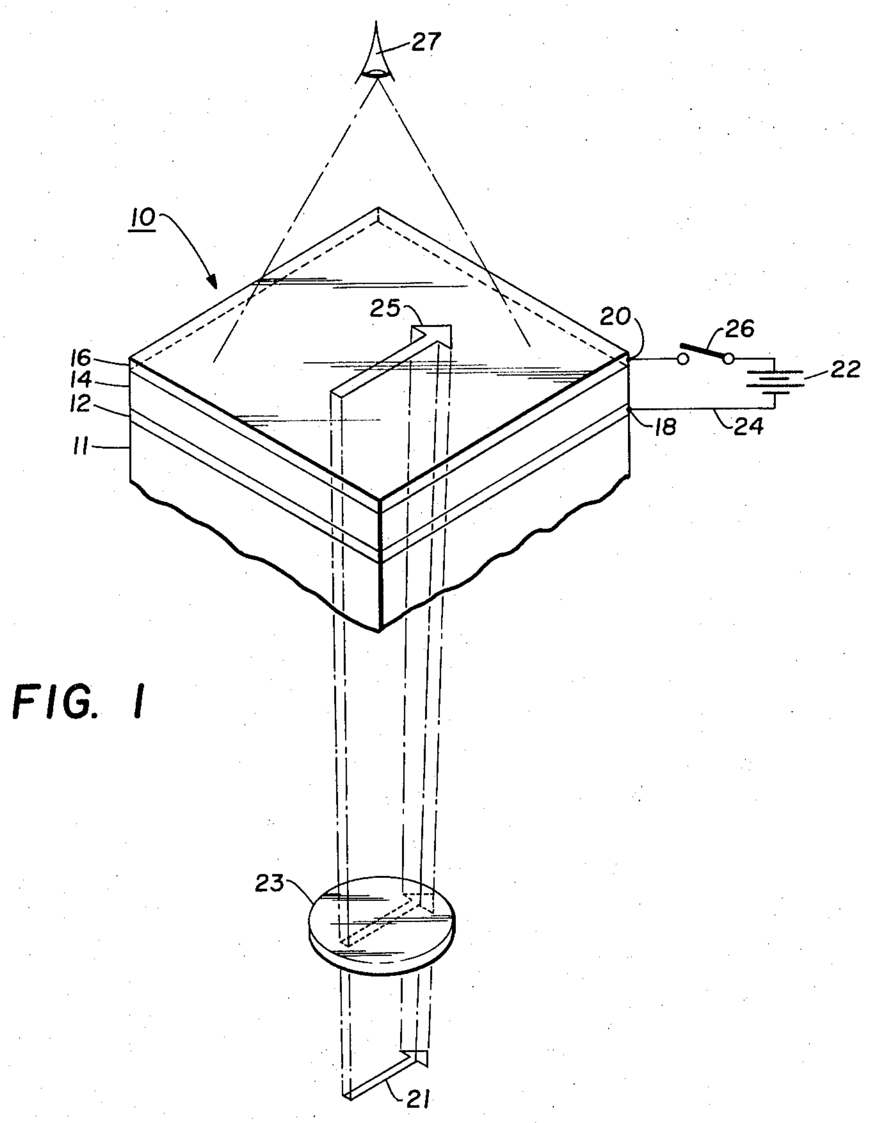
FIG. 1 is a somewhat schematic isometric view of one embodiment of this invention.

Referring now to FIG. 1, a device constructed in accordance with the present invention is indicated generally by the reference numeral 10. The device 10 has a substrate 11 which may be formed of any transparent material of high electrical resistivity which is also suitable for providing mechanical support for the device. Alumina is an example of such a material. A layer 12 of transparent, electrically conductive material is deposited on one surface of the substrate 11. The layer 12 may be formed of any suitable material, such as tin oxide, and may be deposited by any suitable conventional technique, such as sputtering or evaporation.

A layer 14 of thermochromic material is deposited uniformly over the conductive layer 12. The thermochromic material exhibits a change in color with changing temperature, and a marked increase in electrical conductivity in the range of temperatures where the color transition occurs. Many different thermochromic materials are available, each having somewhat different properties. The ones which are most suitable for use in forming the layer 14 are those which exhibit a reversible change from a first color to a sharply contrasting second color at a single well defined temperature, called the critical temperature. In addition, it is necessary that the material exhibit an increase in electrical conductivity as the temperature increases in the region of the critical temperature. The increase in conductivity with increase in temperature should be generally gradual up to the region of the critical temperature, but quite large right at the critical temperature. Other desirable properties are chemical and physical stability, and the ease with which the material can be deposited in layers. Copper iodamercurate ($Cu_2HgI_4$) is particularly well suited for use in the present invention. Copper iodamercurate is red at room temperatures, and exhibits a dramatic change to black at a critical temperature of approximately 70°C. The change is reversible at the same critical temperature. Further, the conductivity of copper iodamercurate increases in the temperature range around 70°C, with a sharp increase at the critical temperature. Another material with suitable properties is silver iodamercurate ($Ag_2HgI_4$), which undergoes a transition between yellow and brown at a critical temperature of approximately 51°C, with the desired increase in conductivity at the critical temperature. Other suitable thermochromic materials are known and may be used in the devices embodying the present invention. The layer 14 may be deposited on layer 12 by spraying a slurry of water and powdered thermochromic material, or by any other suitable process resulting in good thermal and electrical contact with layer 12.

A transparent conductive layer 16 is deposited on top of layer 14. The same materials and method of formation may be used to form layer 16 as were used for layer 12, such as tin oxide deposited by sputtering or evaporation.

Electrical contacts represented schematically at 18 and 20 may be formed at the edges of conductive layers 12 and 16, respectively, and may be formed from any suitable metal such as gold, for example, by conventional evaporation techniques. A voltage source, represented by the battery 22, is connected by conductor 24 and by switch 26 to contacts 18 and 20 so that a potential can be applied across the thermochromic layer 14 by closing switch 26.

The device 10 is maintained at a temperature just below the critical temperature of the thermochromic material of layer 14, and is preferably disposed in an evacuated chamber to reduce heat transfer along the face of the device and thus blurring of the image by convection currents. The magnitude of the potential applied across thermochromic layer 14 is selected so that the low current lead through the thermochromic layer at temperatures below the critical temperatures does not heat the thermochromic material above the critical temperature in the absence of a predetermined quantity of radiant heat energy striking the thermochromic material. The voltage may be adjusted for tuning purposes.

The device 10 may be employed to view objects giving off infrared radiation, such as for example, an object represented by arrow 21. The infrared light image from the object 21 may be focused on the thermochromic layer 14 through the transparent substrate 11 and transparent conductive layer 12 by means of any suitable conventional infrared optical system represented generally by the lens 23. When the infrared image is focused on the thermochromic layer 14, the thermochromic material will be selectively heated in a pattern represented at 25 corresponding to the image of the object 21. By adjusting the potential applied across the thermochromic layer by the voltage source 22, or the temperature of the device 10, the thermochromic material can be caused to threshold only within the image 25 and thus visibly reproduce an image of object 21 as the thermochromic material undergoes a color transition. As the temperature of the thermochromic material approaches the critical temperature, its conductivity begins to increase markedly, resulting in an increase in current through the thermochromic material in the area of the image 25, thus tending to further increase the temperature of the thermochromic material in the area of the image 25. The increased conductivity with respect to temperature of the thermochromic material results in a runaway condition which abruptly thresholds the thermochromic material causing a very rapid color change. The result is a visible black on red image which may be viewed through the transparent conductive layer 16 by an observer at point 27. It will be appreciated that the infrared image is both made visible and amplified by the device 10. The infrared image is amplified. in effect, because the infrared image need only overcome the stable condition and institute the runaway condition due to the increased conductivity of the thermochromic material to achieve a sharply constrasting visible image.

Once formed, the black on red image will persist after the infrared image is interrupted for as long as the potential is maintained across the thermochromic layer 14 because the increased current through the thermochromic material in the area of the image 25 will maintain the thermochromic material above its critical temperature. However, the image can be erased by opening switch 26 and permitting the thermochromic material in the area of the image 25 to cool and thereby return to its normal red color. If a moving image display is desired, the potential applied across the thermochromic layer may be pulsed at a rate selected to permit the themochromic material to cool below the critical temperature. Although the operation of device 10 has been described in connection with the formation of a visible image from an infrared image, it will be appreciated that the device will produce visible images of any pattern of heat applied to the thermochromic layer 14.

As previously mentioned, conductive layers 12 and 16 are preferably formed from a transparent material such as tin oxide. This permits the infrared image to be focused on thermochromic layer 14 through the transparent substrate 11 and transparent layer 12, and the visible image to be viewed through transparent layer 16. However, one of the conductive layers 12 or 16 may be formed from an opaque conductive material such as graphite, in which case both focusing of the incident energy and viewing of the resulting image can be accomplished through the one transparent conductive layer. Since graphite is a good electrical conductor but a poor heat conductor, improved image resolution can be achieved by the use of the graphite to retard the spread of thermal energy from the image area 25.

Figure 2:
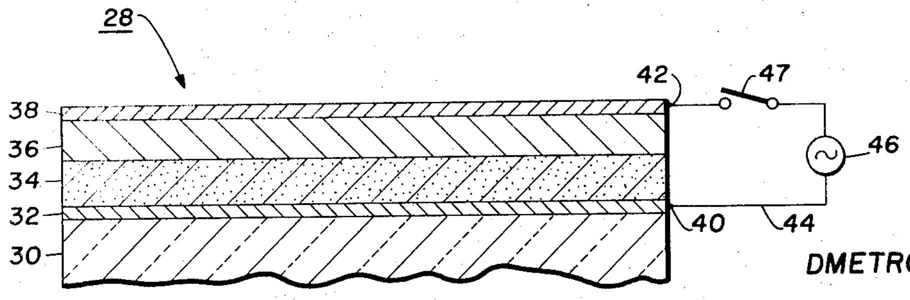
FIG. 2 is a somewhat schematic sectional view of another embodiment of this invention.

Another device constructed in accordance with the present invention is indicated generally by the reference numeral 28 in FIG. 2. The device 28 includes a transparent substrate 30, which may be identical to substrate 11, and may be alumina. A transparent electrically conductive layer 32 is deposited on the substrate 30, and may comprise tin oxide deposited as heretofore described. Next, a layer 34 of thermochromic material is applied over the conductive layer 32. The thermochromic material in layer 34 may be applied as heretofore described, and may comprise substantially any thermochromic material since the degree of contrast between the two color states is not an important consideration in the device 28 for reasons which will hereafter become evident. A layer 36 of electro luminescent material is then deposited on the thermochromic layer 34. Electro luminescent materials which exhibit the phenomenon of luminescence when an alternating electric current is passed through the material are well known. Examples of such materials are the zinc sulfide phosphors activated by copper, manganese, aluminum or silver. Substantially any of the electro luminescent materials may be used to form layer 36, the choice depending, for example, upon the color of display desired. The electro luminescent layer 36 may be formed by making a slurry from electro luminescent powders and spraying the slurry on layer 34. A second transparent conductive layer 38 is then formed on layer 36. Tin oxide may again be used for layer 38 and applied using a sputtering or evaporation process.

An alternating voltage source 46 is connected across the conductive layers 32 and 38 by conductor 44 and switch 47 which are connected at contacts 40 and 42, respectively. The device 28 is preferably disposed in a vacuum chamber and a means is provided to heat the device so that the thermohchromic layer 34 will be maintained at a temperature just below the critical temperature of the material. In this condition, the conductivity of the thermochromic layer 34 is relatively low so that the a.c. current passed through the electro luminescent layer 36 is also relatively low. In such a state, the degree of luminescence of the electro luminescent layer 36 is relatively low.

When a heat image is focused on the thermochromic layer 34, the conductivity of the thermochromic layer increases at a relatively high rate in the areas where heated by the image. As a result, the current through the electro luminescent layer 36 is increased because the two layers are serially connected in the electrical circuit, and the image is reproduced by the luminescence of the electro luminescent layer 36. The luminescent image formed by layer 36 may be viewed through transparent conductive layer 38.

It will be noted that the intensity of the luminescent image produced by the electro luminescent layer 36 may vary in an analog manner generally in accordance with the intensity of the heat image impressed upon the thermochromic layer 34. This is true because the circuit between any two points on the conductive layers 32 and 38 consists of a portion of layer 36 connected in series with a portion of layer 34. Thus, even though the conductivity of layer 34 increases at a very rapid rate in the region of the threshold temperature, the current does not necessarily result in a runaway condition because the substantially fixed resistance of the electro luminescent layer 36 acts as a load resistance. As a result, even though the thermochromic layer 34 may be thresholded and change colors, the increased current through layer 34 need not cause a runaway condition due to resistive heating.

Figure 3:
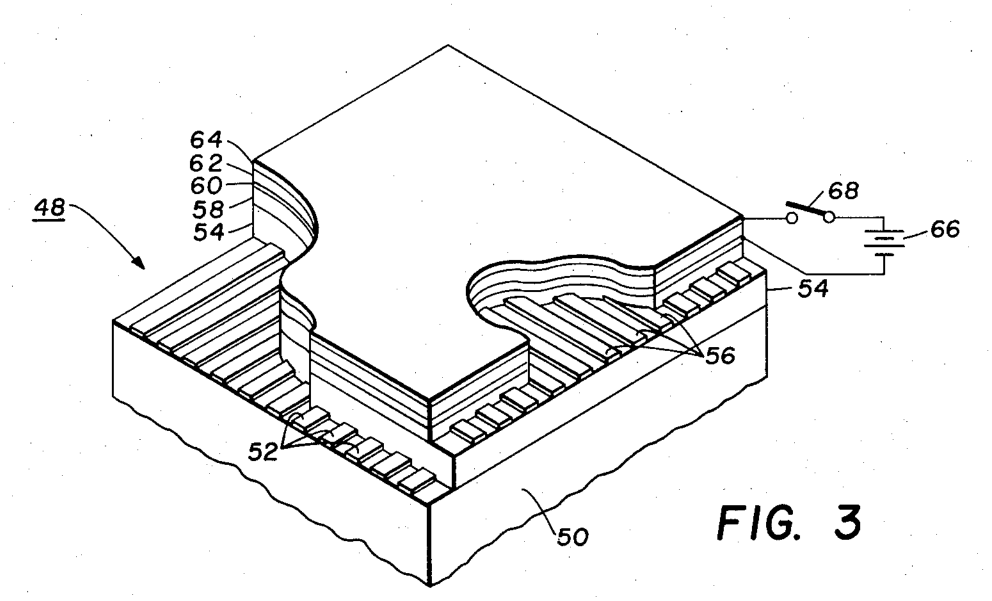
FIG. 3 is a somewhat schematic isometric view, partially broken away, illustrating yet another embodiment of this invention.

Another embodiment of the present invention is indicated generally by the reference numeral 48 in FIG. 3. The display device 48 illustrated in FIG. 3 is comprised of a substrate 50 which need not necessarily be transparent. A first set of thin film conductors 52 are formed on the face of the substrate 50 by any suitable process, such as by vapor deposition through a mask, or by vapor deposition followed by conventional photo-resist and etching techniques. The conductors 52 may be from any suitable metal such as copper, aluminum, or the like. Next, a layer 54 of relatively high resistivity material is deposited over the conductors 52. The resistive layer 54 might have a resistivity on the order of ten times the resistivity of the metal used for conductors 52 such as, for example, very pure silicon applied by sputtering to give it polycrystallinity. The resistive material of the layer 54 should have a thermal coefficient of expansion close to that of conductors 52 so that a good bond can be maintained during temperature cycling. A second set of parallel conductors 56 are deposited on the resistive layer 54 and are disposed orthogonal to the set of parallel condutors 52. The conductors 56 may be formed using the same metal and processes used to form conductors 52, and are of the same size and spacing. Next, an insulating layer 58 is deposited over the conductors 56. The insulating layer may be silicon dioxide, polymerized etch resist, or other suitable insulating material. Then a conductive layer 60, such as tin oxide, is deposited over the insulating layer 58, followed by a thermochromic layer 62 and a final transparent conductive layer 64, such as tin oxide. Layers 60, 62, and 64 may be identical to layers 12, 14 and 16 of the device 10. A potential may be selectively applied across the thermochromic layer 62 by a voltage supply represented by the battery 66 which is selectively connectable across the conductive layers 60 and 64 by switch 68.

The device 48 is preferably disposed in a vacuum and the thermochromic layer 62 is maintained at a temperature just below its critical temperature when switch 68 is closed and a potential applied across the thermochromic layer 62. Then a potential is selectively applied between any one of the conductors 52 and any one of the conductors 56 by a suitable switching means, not illustrated, which may be either electronic or mechanical as will be evident to those skilled in the art. The resulting current through the resistive layer 54 will cause a resistively heated localized hot spot at the coordinate represented by the two selected conductors which will heat a spot at the corresponding coordinate point on the thermochromic layer 62. The potential applied across conductive layers 60 and 64 will retain the point images by the resistive heating of the thermochromic material as heretofore described in connection with the device 10 until the switch 68 is opened, at which time the thermochromic layer will cool and revert back to its original color, thereby erasing the image. A moving image, in this case a sweeping point similar to one on an oscilloscope, may be obtained by pulsing the potential applied across the thermochromic layer 62 while a potential is sequentially applied between selected pairs of conductors, each pair comprising one conductor from set 52 and one from set 56.

Figure 4:
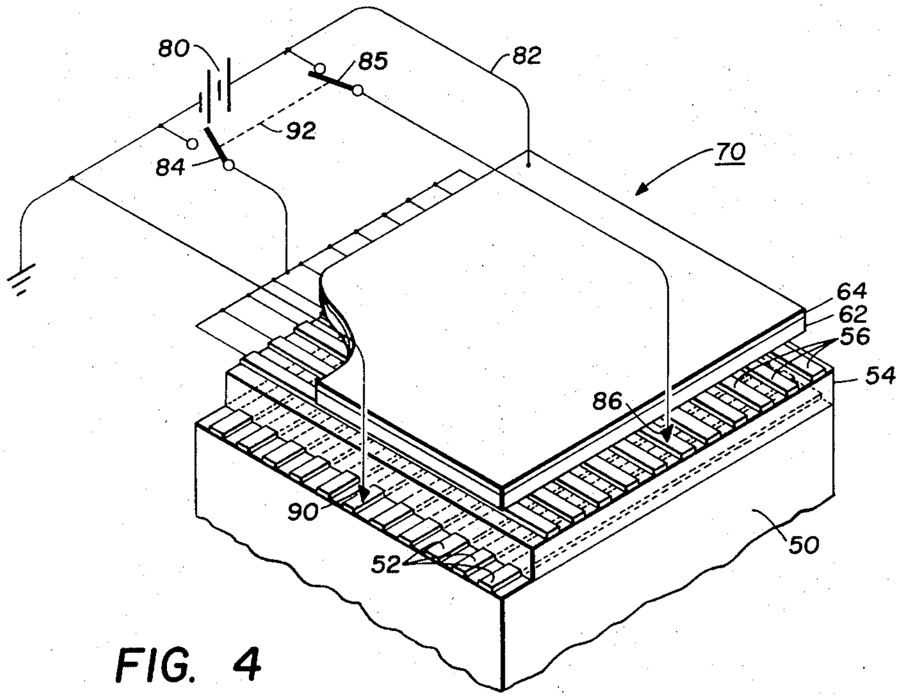
FIG. 4 is a schematic isometric diagram illustrating still another embodiment of this invention.

Another device constructed in accordance with the present invention is indicated generally by the reference numeral 70 in FIG. 4. The device 70 is substantially identical to the device 48 except that the insulating layer 58 and the conductive layer 60 are omitted. Accordingly, the components of the device 70 which are identical to the components of the device 48 are indicated by the corresponding reference numerals. Thus, the device 70 is comprised of the substrate 50, the lower set of parallel conductors 52, the layer of resistive material 54, the upper set of parallel conductors 56 disposed orthogonal to the lower set of conductors 52, the thermochromic layer 62, and the top transparent conductive layer 64.

A potential may be applied across the thermochromic layer 62 by a voltage supply represented by the battery 80 which is connected by conductor 82 to the transparent conductive layer 64 and by a switching means 84 to the upper set of conductors 56. The negative terminal of the voltage source 80 is grounded so that when the switch 84 is closed, all of the conductors 56 are connected to ground. The positive terminal of the voltage supply 80 is also selectively connectable to any one of the conductors 56 by a switch 85 and a suitable switching means represented by the contact 86. Any one of the conductors 52 may be selectively connected to ground by a suitable switching means represented by the sliding contact 90. In one mode, the switch 85 may be operated in the alternative with the switch 84 as represented by the dotted interconnecting line 92 so that only one is closed at any time, and in an alternative mode, both switches may be opened simultaneously in order to erase an image as will hereafter be described.

The device 70 is preferably located in a vacuum and is maintained at a temperature just below the critical temperature of the thermochromic layer 62 so that at the potential applied by voltage source 80, the thermochromic material remains below the threshold temperature in the absence of an externally supplied heat. When operated in the first mode, the switches 84 and 85 are alternately closed at a rate in excess of the cooling rate of the thermochromic material 62. As a result, during one portion of the cycle, a potential from voltage source 80 is applied between the conductor 52 selected by contact 90 and the conductor 56 selected by contact 86 through switch 85. During the other portion of the cycle, a potential is applied between transparent conductive layer 64 and all of the conductors 56 through switch 84. During the period that switch 85 is closed, current passing through resistive layer 54 produces a local hot spot at the apparent intersection of the selected conductors which thresholds the overlying portion of the thermochromic layer 62 so that its color abruptly changes and its conductivity greatly increases. Then during the period when switch 84 is closed, the increased current through the heated portion of the thermochromic layer maintains the thermochromic material above the critical temperature so that the spot of the thermochromic material which has a color transition is maintained. Thus, the hot spot can be scanned by moving the contacts 86 and 90 to produce substantially any desired image in the thermochromic layer, and the image will be maintained so long as switch 84 remains closed during the half cycle of the operation for a period long enough to keep the thermochromic material heated.

When it is desired to erase the image formed by the thermochromic layer, both switches 84 and 85 may be momentarily opened to permit all images on the thermochromic material to be erased as a result of the entire thermochromic layer 62 cooling below the critical temperature. Thus, it will be noted that the device 70 may be operated as either a fixed image, a moving image or a scanning spot display merely by controlling the duty cycles of switches 84 and 85.

Although preferred embodiments of the invention have been described in detail, it is to be understood that various changes, substitutions and alterations can be made therein without departing from the spirit and scope of the invention.

What is claimed is:

1. In an image display system, the combination of:

a layer of thermochromic material having opposite, generally parallel faces defining a thickness, said material having a critical temperature at which it changes color and a negative coefficient of resistivity in the general temperature range of the critical temperature, said thermochromic material being selected from the group consisting of copper iodamercurate ($Cu_2HgI_4$) and silver iodamercurate ($Ag_2HgI_4$), means for applying a potential between the faces of the thermochromic material, means for controlling the ambient temperature of said thermochromic layer to maintain said layer at a temperature below its critical temperature when the potential is applied in the absence of selectively applied heat, and means for heating the layer of thermochromic material in selected areas of one of said faces to reduce the resistance of the layer in said selected areas, thereby increasing the current through the areas and further heating the areas to the threshold temperature thereby to cause said selected areas to change colors and produce an image.

2. The combination defined in claim 1 wherein said means for heating the layer of thermochromic material comprises:

means for focusing a radiant heat image on selected areas of said thermochromic material.

3. The combination defined in claim 1 wherein said means for heating the layer of thermochromic material comprises:

means for focusing an infrared image on selected areas of said layer of thermochromic material.

4. The combination defined in claim 1 wherein said means for heating the thermochromic material comprises:

means for selectively heating the layer of thermochromic material at coordinately selected positions.

5. The combination defined in claim 1 wherein the means for applying a potential across the thermochromic layer comprises:

a conductive film adjacent each of the opposite faces, at least one of the films being transparent to radiant heat energy.

6. The combination defined in claim 5 wherein:

both of the conductive films are transparent to visible light and the layer of thermochromic material and films are supported on a transparent substrate.

7. The combination defined in claim 1 wherein:

the means for applying a potential across the layer comprises a transparent conductive film adjacent one face of the layer and a first plurality of parallel conductors adjacent the other face of said thermochromic layer and the means for heating the layer of thermochromic material comprises a film of high resistance material disposed adjacent the first plurality of parallel conductors, a second plurality of parallel conductors disposed adjacent the high resistance film and orthogonal to said first plurality of conductors and means for selectively applying a potential between any one of the first set of parallel conductors and any one of the second set of parallel conductors to resistively heat a selected coordinate point of the high resistance film and thus the corresponding coordinate point of the thermochromic layer.

8. The combination defined in claim 1 wherein:

the means for applying a potential across the thermochromic layer comprises first and second conductive films disposed adjacent the opposite faces of said thermochromic layer, the first conductive film being transparent and the means for heating the thermochromic layer comprises first and second sets of parallel conductors disposed adjacent the opposite faces of a sheet of high resistivity material, the sets of parallel conductors being disposed orthogonal one to the other, and further chracterized by an insulating layer disposed between the first set of conductors and the second conductive film.

* * * * *